US009755947B2

(12) United States Patent
Munoz (10) Patent No.: US 9,755,947 B2
(45) Date of Patent: Sep. 5, 2017

(54) HIERARCHICAL SELF-ORGANIZING CLASSIFICATION PROCESSING IN A NETWORK SWITCH

(71) Applicant: Intel Corporation, Santa Clara, CA (US)

(72) Inventor: Robert J. Munoz, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 1049 days.

(21) Appl. No.: 13/746,104

(22) Filed: Jan. 21, 2013

(65) Prior Publication Data

US 2013/0142205 A1  Jun. 6, 2013

Related U.S. Application Data

(63) Continuation-in-part of application No. 12/782,379, filed on May 18, 2010, now Pat. No. 9,081,742, and
(Continued)

(51) Int. Cl.
*H04L 12/751* (2013.01)
*G06F 9/30* (2006.01)
(Continued)

(52) U.S. Cl.
CPC .............. *H04L 45/08* (2013.01); *G06F 9/264* (2013.01); *G06F 9/30058* (2013.01);
(Continued)

(58) Field of Classification Search
None
See application file for complete search history.

(56) References Cited

U.S. PATENT DOCUMENTS 4,622,631 A    11/1986  Frank et al.
5,485,578 A *   1/1996  Sweazey .................. 709/224
(Continued)

FOREIGN PATENT DOCUMENTS

JP     H02-271444      11/1990

OTHER PUBLICATIONS

Office action from related U.S. Appl. No. 13/192,104, dated Jun. 16, 2014, 25 pages.
(Continued)

*Primary Examiner* — Corey S Faherty
(74) *Attorney, Agent, or Firm* — Nicholson De Vos Webster & Elliott LLP (57) ABSTRACT

Described embodiments process data packets received by a switch coupled to a network processor. The switch determines whether one or more rules for classifying and processing the received packet are stored in an internal classification database of the switch. If one or more rules are stored in the internal database, the switch updates statistics corresponding to each of the rules and classifies and processes the received packet in accordance with the rules. If no associated rules are stored in the internal database, the switch tags the received packet with metadata and forwards the packet to the network processor. The network processor determines one or more rules for classifying and processing the forwarded packet in a classification database of the network processor and updates statistics corresponding to each rule. The network processor classifies and processes the packet in accordance with the rules and updates the internal database of the switch.

20 Claims, 6 Drawing Sheets

Related U.S. Application Data a continuation-in-part of application No. 12/782,411, filed on May 18, 2010, now Pat. No. 8,407,707, and a continuation-in-part of application No. 13/705,822, filed on Dec. 5, 2012, and a continuation-in-part of application No. 12/782,393, filed on May 18, 2010, now Pat. No. 8,255,644.

(60) Provisional application No. 61/732,129, filed on Nov. 30, 2012.

(51) Int. Cl.
| | | |
|---|---|---|
| *G06F 9/38* | (2006.01) | |
| *G06F 9/26* | (2006.01) | |
| *H04L 12/933* | (2013.01) | |
| *H04L 12/935* | (2013.01) | |
| *H04L 12/851* | (2013.01) | |
| *H04L 12/931* | (2013.01) | |

(52) U.S. Cl.
CPC ...... *G06F 9/30061* (2013.01); *G06F 9/30094* (2013.01); *G06F 9/3885* (2013.01); *H04L 47/2441* (2013.01); *H04L 47/2483* (2013.01); *H04L 49/109* (2013.01); *H04L 49/3009* (2013.01); *H04L 49/101* (2013.01); *H04L 49/351* (2013.01)

(56) References Cited

U.S. PATENT DOCUMENTS

| | | | |
|---|---|---|---|
| 5,623,698 | A | 4/1997 | Stephenson et al. |
| 5,875,466 | A | 2/1999 | Wakerly |
| 5,892,766 | A | 4/1999 | Wicki et al. |
| 5,920,539 | A | 7/1999 | Schell et al. |
| 5,943,283 | A | 8/1999 | Wong et al. |
| 6,038,630 | A | 3/2000 | Foster et al. |
| 6,195,335 | B1 | 2/2001 | Calvignac et al. |
| 6,279,080 | B1 * | 8/2001 | DeRoo ............... G06F 12/0804 711/135 |
| 6,452,931 | B1 * | 9/2002 | Norman, Jr. .................. 370/405 |
| 6,539,488 | B1 * | 3/2003 | Tota ........................ G06F 5/06 710/305 |
| 6,567,564 | B1 | 5/2003 | van der Wal |
| 6,611,867 | B1 * | 8/2003 | Bowman-Amuah ......... 709/224 |
| 6,636,932 | B1 | 10/2003 | Regev et al. |
| 7,079,539 | B2 | 7/2006 | Calle et al. |
| 7,089,346 | B2 | 8/2006 | Cebulla et al. |
| 7,103,008 | B2 * | 9/2006 | Greenblat et al. ............ 370/258 |
| 7,234,018 | B1 | 6/2007 | Purcell et al. |
| 7,274,700 | B2 | 9/2007 | Jin et al. |
| 7,461,208 | B1 | 12/2008 | Caprioli et al. |
| 7,596,142 | B1 | 9/2009 | MacAdam |
| 7,707,367 | B1 | 4/2010 | Tran et al. |
| 8,135,926 | B1 | 3/2012 | Glasco et al. |
| 2002/0029214 | A1 | 3/2002 | Yianilos et al. |
| 2002/0099913 | A1 | 7/2002 | Steely, Jr. |
| 2002/0165985 | A1 | 11/2002 | Chen et al. |
| 2003/0033276 | A1 | 2/2003 | Cheng et al. |
| 2003/0123468 | A1 | 7/2003 | Nong |
| 2004/0068616 | A1 | 4/2004 | Tierney et al. |
| 2004/0255209 | A1 | 12/2004 | Gross |
| 2005/0027920 | A1 | 2/2005 | Fitzsimmons et al. |
| 2005/0152352 | A1 | 7/2005 | Jun et al. |
| 2005/0160132 | A1 | 7/2005 | Van Doren et al. |
| 2006/0256783 | A1 | 11/2006 | Ayrapetian et al. |
| 2007/0011396 | A1 | 1/2007 | Singh et al. |
| 2007/0016756 | A1 | 1/2007 | Hsieh et al. |
| 2007/0226798 | A1 | 9/2007 | Sibert |
| 2008/0046657 | A1 | 2/2008 | Eichenberger et al. |
| 2008/0155002 | A1 | 6/2008 | Janczak et al. |
| 2008/0162793 | A1 | 7/2008 | Chu et al. |
| 2008/0240103 | A1 | 10/2008 | Schmidt |
| 2009/0006718 | A1 | 1/2009 | Blumrich et al. |
| 2009/0249318 | A1 | 10/2009 | Ayguade et al. |
| 2010/0020806 | A1 | 1/2010 | Vahdat et al. |
| 2010/0100682 | A1 | 4/2010 | Guthrie et al. |
| 2010/0260198 | A1 | 10/2010 | Rojas-Cessa et al. |
| 2010/0293353 | A1 | 11/2010 | Sonnier et al. |
| 2011/0145501 | A1 | 6/2011 | Steely, Jr. et al. |

OTHER PUBLICATIONS

Office action from related U.S. Appl. No. 13/192,104, dated Sep. 29, 2014, 26 pages.

Office action from related U.S. Appl. No. 13/192,104, dated Jan. 29, 2015, 27 pages.

* cited by examiner

HIERARCHICAL SELF-ORGANIZING CLASSIFICATION PROCESSING IN A NETWORK SWITCH

CROSS-REFERENCE TO RELATED APPLICATIONS

This application claims the benefit of the filing date of U.S. provisional application No. 61/732,129 filed Nov. 30, 2012, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644 and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719 filed Nov. 28, 2012, Ser. No. 13/587,772 filed Nov. 28, 2012, Ser. No. 13/687,865 filed Nov. 28, 2012, Ser. No. 13/687,911 filed Nov. 28, 2012, Ser. No. 13/687,971 filed Nov. 28, 2012, and Ser. No. 13/746,080 filed Jan. 21, 2013, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors are generally used for analyzing and processing packet data for routing and switching packets in a variety of applications, such as network surveillance, video transmission, protocol conversion, voice processing, and internet traffic routing. A network processor might employ a destination Media Access Control (MAC) address embedded in a packet generated by a source network device to transmit the packet to one or more appropriate target devices.

A network processor operating in accordance with IEEE 802.1D (see sections 7.8 and 7.9 of 802.1D-2004, included by reference herein) might "learn" MAC addresses of source and destination network devices to provide more efficient processing of packets. To "learn" MAC addresses, a network processor might store a table of MAC addresses and the corresponding port to which the device having that MAC address is connected. When a packet is received from a new network device, the network processor stores the MAC address and the port from which the packet was received. Thus, when a received packet is destined for a MAC address that is stored in the table, the network processor forwards the packet to the port stored in the table without sending traffic on other ports. A network processor operating in accordance with IEEE 802.1D might also remove older or unused MAC addresses from the table ("aging"). MAC address aging maintains efficient processing of packets by removing infrequently used addresses from the table. Removing infrequently used addresses saves storage space and allows the network processor to find the MAC addresses more quickly.

Many hardware-based MAC address learning and aging mechanisms support higher-speed performance in part because they store MAC addresses in dedicated on-chip memory, typically limiting maximum usable table sizes. Many software-based MAC address learning and aging mechanisms support high table capacity using external DRAM, though they often have slower performance and consume a non-trivial amount of processing resources to maintain and check the address table.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments process data packets received by a switch coupled to a network processor. The switch determines whether one or more rules for classifying and processing the received packet are stored in an internal classification database of the switch. If one or more rules are stored in the internal database, the switch updates statistics corresponding to each of the rules and classifies and processes the received packet in accordance with the rules. If no associated rules are stored in the internal database, the switch tags the received packet with metadata and forwards the packet to the network processor. The network processor determines one or more rules for classifying and processing the forwarded packet in a classification database of the network processor and updates statistics corresponding to each of the rules in the classification database of the network processor. The network processor classifies and processes the packet in accordance with the rules in the classification database of the network processor, and updates the internal database of the switch.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments process data packets received by a switch coupled to a network processor. The switch determines whether one or more rules for classifying and processing the received packet are stored in an internal classification database of the switch. If one or more rules are stored in the internal database, the switch updates statistics corresponding to each of the rules and classifies and processes the received packet in accordance with the rules. If no associated rules are stored in the internal database, the switch tags the received packet with metadata and forwards the packet to the network processor. The network processor determines one or more rules for classifying and processing the forwarded packet in a classification database of the network processor and updates statistics corresponding to each of the rules in the classification database of the network processor. The network processor classifies and processes the packet in accordance with the rules in the classification database of the network processor, and updates the internal database of the switch.

Table 1 defines a list of acronyms employed throughout this specification as an aid to understanding the described embodiments:

TABLE 1

| ACL | Access Control List | AMBA | Advanced Microcontroller Bus Architecture |
|---|---|---|---|
| AXI | Advanced eXtensible Interface | COS | Class of Service |
| CPU | Central Processing Unit | CRC | Cyclic Redundancy Check |
| DDR | Double Data Rate | DMA | Direct Memory Access |
| DRAM | Dynamic Random Access Memory | ECC | Error Correction Code |
| FC | Fibre Channel | FIFO | First-In, First-Out |
| I/O | Input/Output | IP | Internet Protocol |
| JTAG | Joint Test Action Group | LRU | Least Recently Used |
| MAC | Media Access Control | µP | Microprocessor |
| MMB | Memory Manager Block | MPLS | Multi-Protocol Label Switching |
| MPP | Modular Packet Processor | MRU | Most Recently Used |
| MTM | Modular Traffic Manager | OSI | Open Systems Interconnection |
| NP | Network Processor | PAB | Packet Assembly Block |
| PCI-E | Peripheral Component Interconnect Express | PDU | Protocol Data Unit |
| PLB | Processor Local Bus | RF | Radio Frequency |
| SAS | Serial Attached SCSI | SATA | Serial Advanced Technology Attachment |
| SCH | Scheduler | SCSI | Small Computer System Interface |
| SED | Stream Editor | SLIP | Serial Line Internet Protocol |
| SoC | System-on-Chip | SPI | Serial Peripheral Interface |
| SPP | Security Protocol Processor | SRIO | Serial Rapid I/O |
| SWD | Serial Wire Debug | TCP | Transmission Control Protocol |
| UART | Universal Asynchronous Receiver/Transmitter | UDP | User Datagram Protocol |
| USB | Universal Serial Bus | VLAN | Virtual Local Area Network |

Figure 1:
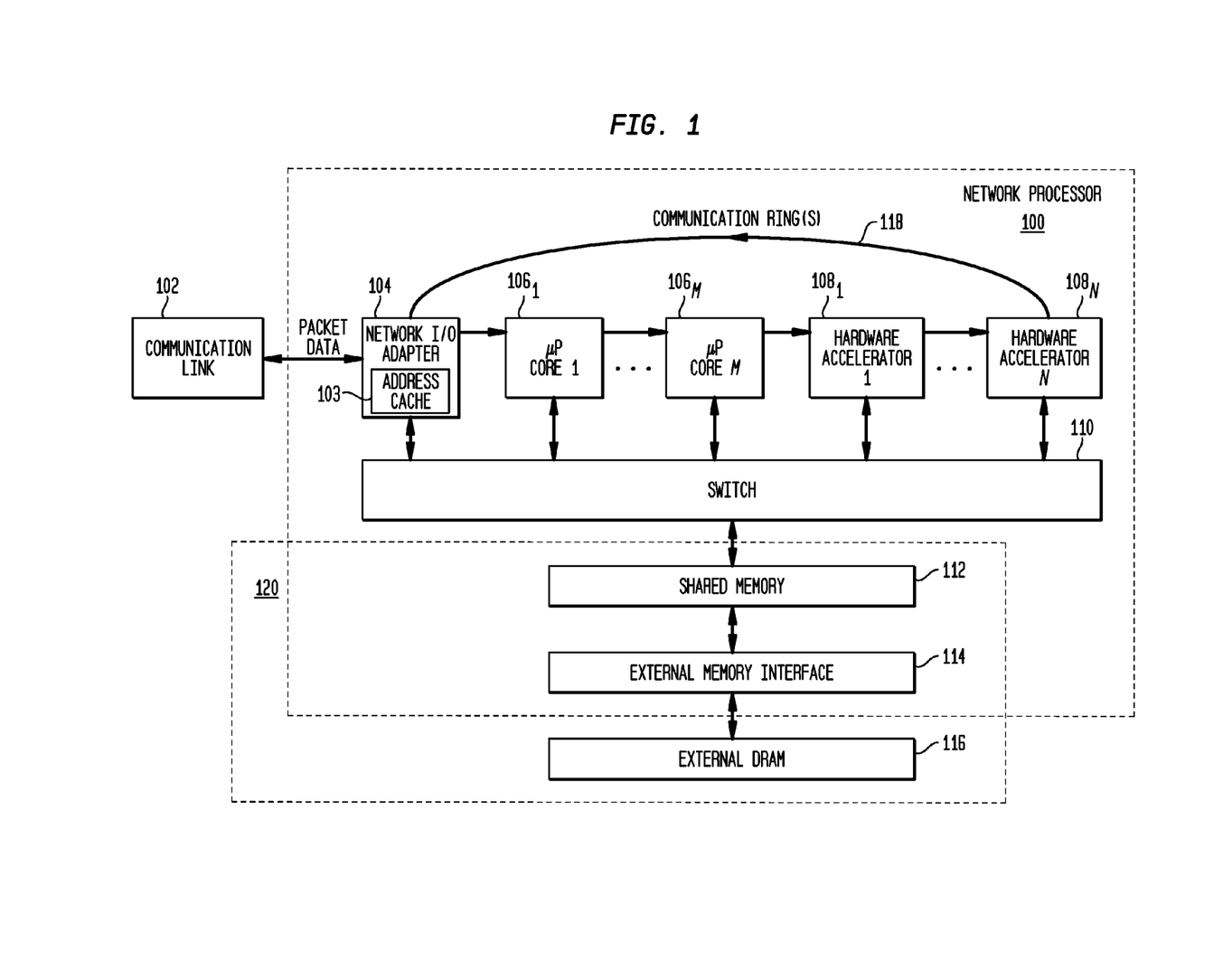
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_m$, and one or more hardware accelerators $108_1$-$108_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a double-data-rate (e.g., DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

Network I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In described embodiments, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In described embodiments, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. Network I/O interface 104 might parse the received data packet and provide the received data packet, via switch 110, to a buffer in shared memory 112.

Network I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, network I/O interface 104 might be implemented as input (receive) only or output (transmit) only interfaces. As shown in FIG. 1, network I/O interface 104 might include address cache 103. Address cache 103 might be employed in performing media access control (MAC) address learning (e.g., to support the IEEE 802.1 standard (see sections 7.8 and 7.9 of 802.1D-2004) such as described in related U.S. patent application Ser. No. 13/705,822 filed Dec. 5, 2012 and incorporated by reference herein.

The various μP cores 106 and hardware accelerators 108 of network processor 100 might include several exemplary types of processors or accelerators. For example, the various μP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state.

The output of the SED can become the outgoing packet data and can update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Typical OSI level 2 networking devices such as a LAN switch/bridge might learn MAC addresses of connected devices in the network to identify on which port to send traffic. Such LAN bridges might typically keep a MAC learning table or bridging table to associate known MAC addresses with a given port. For example, the source MAC address of each packet received by the LAN bridge is stored in the table so that future packets destined for that address can be forwarded only to the bridge interface or port on which that address is located. Packets destined for unrecognized addresses are forwarded out every bridge interface or port. This scheme helps minimize traffic on the attached LANs. MAC address learning is defined in the IEEE 802.1 standard (see sections 7.8 and 7.9 of 802.1D-2004, included by reference herein). However, in hardware-based solutions, limited memory resources in a LAN bridge can limit the maximum number of MAC addresses that can be learned in the bridge table. In some implementations, the manner in which the hardware memory is organized and searched, such as when certain hash table-based approaches are used, can limit the minimum guaranteed number of addresses that can be stored in the hardware-based mechanism under worst case conditions. Conversely, software-based solutions use a slower external memory and consume processing cycles to access the memory.

Described embodiments, such as network processor 100, employ a hardware-based mechanism as a front end to a software-based mechanism. The software-based mechanism uses higher-latency system memory compared to the hardware-based mechanism. Upon receiving a data packet, network I/O Adapter 104 determines at least one of a source MAC address and one or more destination MAC addresses for the data packet. The determined MAC addresses might be stored in address cache 103 within network I/O adapter 104. The data packet might be provided from network I/O adapter 102 to one or more processing modules of network processor 100 (e.g., µP cores 106 or hardware accelerators 108) for processing of the data packet, if needed. Additionally, a control signal might be sent from network I/O adapter 102 to a control processor of network processor 100 (e.g., one of µP cores 106) to indicate the learned MAC addresses. Network processor 100 then stores the learned MAC addresses in system memory 120.

The hardware-based front-end (e.g., network I/O adapter 104) performs address learning and aging for the most frequently and recently used MAC addresses. Therefore, the software-based memory is only accessed for a relatively small percentage of address look-ups that are not accommodated by the hardware-based memory. Described embodiments synchronize the hardware table stored in address cache 103 and the software bridging table stored in system memory 120. In embodiments having multiple independent hardware-based caches, synchronization is maintained between all of the caches and the software table stored in system memory 120.

When the hardware-based mechanism sends the packet into the system, it indicates, via metadata carried with the packet, the MAC address table lookup result which also indicates whether the destination MAC address was known or not. The software-based mechanism only needs to do a destination MAC lookup on those packets with destination addresses that are not known by the hardware-based mechanism.

As described herein, described embodiments provide: (1) a mechanism for hardware and software bridging to keep in synchronization by using the task ring (e.g., one of communication rings 118) of network processor 100. The synchronization does not require software running on a control processor of network processor 100 (e.g., one of μP cores 106), but that can instead be performed using field-programmable logic within the MPP engine of network processor 100. Synchronization supports both adding and removing addresses from the both the hardware memory and the software memory.

Figure 2:
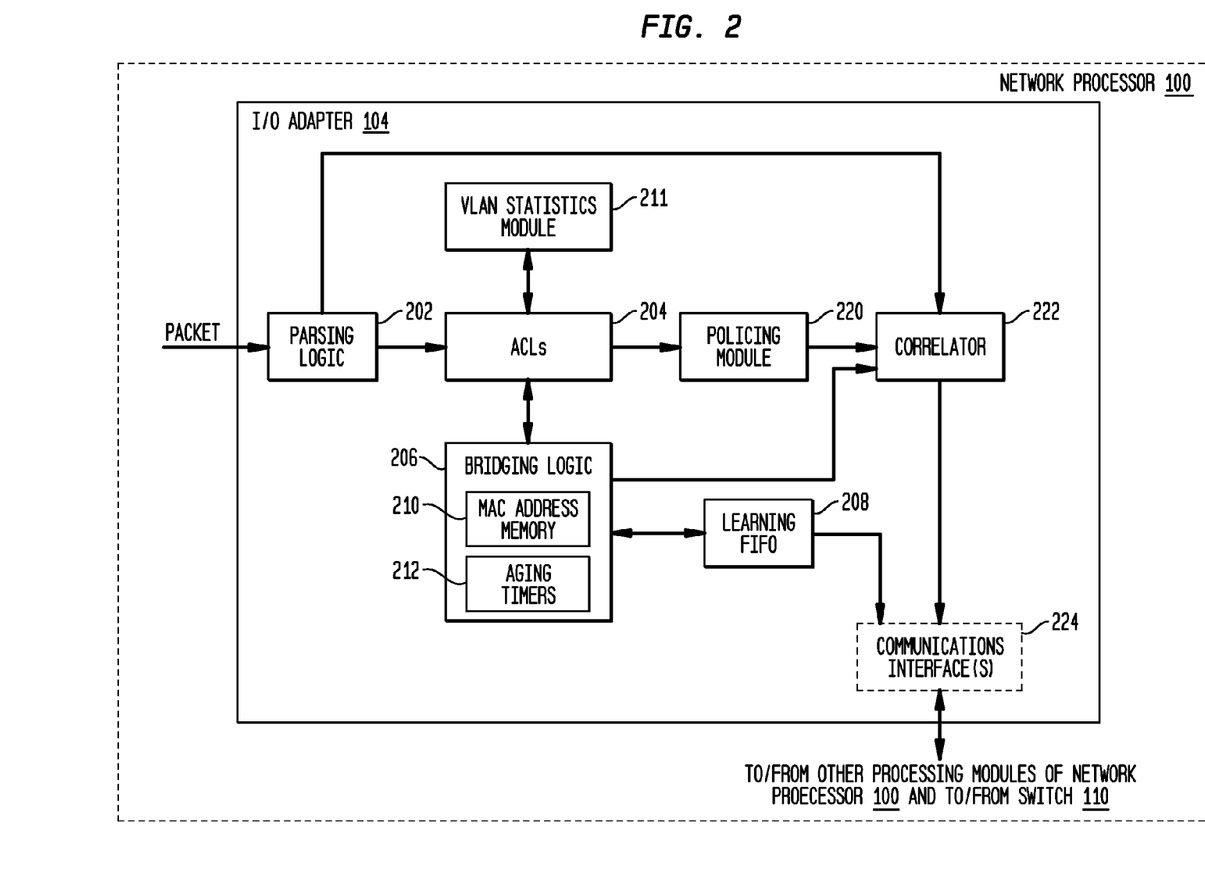
FIG. 2 shows an exemplary block diagram of an I/O adapter of the network processor of FIG. 1.

FIG. 2 shows a block diagram of network I/O adapter 104. As described herein, network I/O adapter 104 might be at least one of a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces. In some embodiments, network I/O adapter 104 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART) such as described in related U.S. patent application Ser. No. 13/274,726 filed Oct. 17, 2011.

Parsing logic 202 extracts various data fields from received packets. For example, parsing logic 202 might extract OSI Layer 2, Layer 3 or Layer 4 fields from the received packet, such as MAC addresses, MPLS addresses, IP addresses, or TCP/UDP port addresses. Parsing logic 202 might also perform some verification of the received packet, such as verifying a CRC value or IPv4 checksum, or verifying that the packet is properly formed. Depending on the extracted data, parsing logic 202 might also perform special processing for a received packet. For example, parsing logic 202 might detect Ethernet Synchronization Messaging Channel (ESMC) packets and provide them to a specialized data flow of network processor 100. Some specialized packets might be provided to a non-classified packet processing module (not shown), which might generate and enqueue a task for processing within network processor 100 without further processing by network I/O adapter 104. For example, Ethernet "pause" packets, Ethernet "runt" packets, and ESMC packets might be provided to the non-classified packet processing module.

As shown in FIG. 2, network I/O adapter 104 might also have one or more communications interfaces with various modules of network processor 100, shown as other interfaces 224. For example, network I/O adapter 104 receives tasks from other processing modules of network processor 100, the tasks corresponding to packets for transmission onto the network (e.g., via communication link 102). Tasks received might provide address(es) in system memory 120 of packet data to be transmitted.

Typical received packets might be provided to access control lists (ACLs) module 204 and might perform bridging, policing, and correlation for received packets. For example, ACL module 204 includes one or more bridging lists (not shown) for destination addresses corresponding to a received packet. Each list in ACL module 204 includes one or more rules based on, for example, a VLAN corresponding to the packet and a port corresponding to the packet. Bridging logic module 206 determines where to transmit the data packet and typically implements address learning and aging. Bridging logic module 206 controls learning through use of MAC address table 210 and aging timers 212. When hardware learning or aging occurs, bridging logic module 206 sends a task to learning FIFO 208, which in turn sends the task to the task ring (e.g., one of rings 118) via communications interface(s) 224. If FIFO 208 backs up, bridging logic module 206 ceases to learn new addresses and ages out old addresses, thus ensuring the addresses stored in different memories of network processor 100 remain synchronized.

VLAN statistics module 211 might maintain one or more statistics for various virtual local area networks of network processor 100. Such statistics might include a number of packets transmitted, a number of bytes transmitted, a number of packets received, and a number of bytes received for each VLAN of network processor 100. VLAN statistics module 211 receives inputs from ACL module 204 corresponding to packets transmitted and received by network processor 100 to track one or more statistics of each transmitted and received packet. VLAN statistics module 211 might operate substantially as described in related U.S. patent application Ser. No. 13/310,961 filed Dec. 5, 2011.

Figure 3:
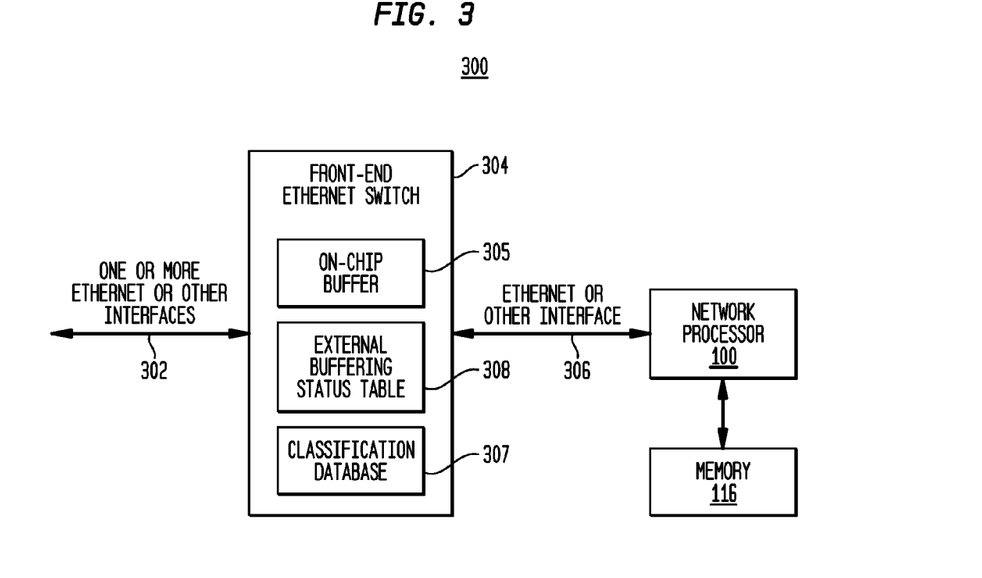
FIG. 3 shows an exemplary Ethernet switch system employing the network processor of FIG. 1.

FIG. 3 shows exemplary system 300 employing network processor 100 and front-end Ethernet switch 304. Packets arrive in the system via external Ethernet links (shown as 302) on Ethernet switch 304. Ethernet switch 304 buffers received packets in on-chip buffer 305. However, in typical Ethernet switches, on-chip buffer 305 is typically small, limiting the buffering capacity of the Ethernet switch. Some embodiments might employ external buffering status table 308 to monitor packet data occupancy of on-chip buffer 305 and, when the data occupancy reaches a threshold, set Ethernet switch 304 to forward packets to port(s) corresponding to network processor 100, which typically has much greater buffering capacity (e.g., memory 116) than Ethernet switch 304. Although shown in FIG. 3 as being connected to switch 304 via an Ethernet connection or a link aggregation group of Ethernet interfaces (e.g., via otherwise unused switch ports on the switch core), other embodiments might employ interface(s) other than an Ethernet interface, and some embodiments might integrate network processor 100 into the same silicon die or package as the switch core of switch 304. Such a system is described in related U.S. patent application Ser. No. 13/746,080, filed on common date, included by reference herein.

Described embodiments provide a system having a fast packet processing device, such as an Ethernet switch or similar device (e.g., switch 304 of FIG. 3), that performs relatively fast packet classification but has relatively low classification database capacity (e.g., classification database 307 of FIG. 3). Ethernet switches support very high throughput operation but have limited address table sizes. The system also includes a packet processing device (e.g., network processor 100 of FIG. 3) that performs relatively slower packet classification but has a much higher classification database capacity than switch 304. Switch 304 classifies packets for which corresponding classification information is stored in classification database 307, and transmits the packets to destination(s) based on the classification information. In described embodiments, packets that cannot be classified by switch 304 (e.g., corresponding classification information is not stored in classification database 307) are provided to network processor 100 for classification since network processor 100 has capacity to store many more classification rules. Thus, packets that cannot be classified by switch 304 might take a relatively longer time to classify, since processing by network processor 100 is needed.

To maximize a number of packets that can be classified by switch 304, network processor 100 dynamically manages the classification information that is stored in classification database 307 to offload a maximum amount of packet classification and processing to front-end switch 304 given the limited capacity of classification database 307. As described herein, embodiments might also coordinate multiple bridging databases between switch 304 and network processor 100. As shown in FIG. 3, exemplary system 300 employs network processor 100 and front-end Ethernet switch 304. Packets arrive in the system via external Ethernet links (shown as 302) on the Ethernet switch device 304. The Ethernet device 304 classifies them using the (limited) information stored in classification database 307 and tags the packet with the classification results (e.g., the packet tag might be task parameter metadata for tasks of network processor 100) before sending the packet to network processor 100 for the remainder of the required processing (if any).

As described herein, system 300 gains increased processing efficiency by offloading packet classification from network processor 100 to front-end Ethernet switch 304. Further, system 300 still supports the full-sized classification database of network processor 100 for instances when the smaller database of switch 304 cannot classify a packet. Network processor 100 monitors the database information that is actively being referenced, both in switch 304 and network processor 100, combined with data from application domain insights and other factors, and determines what subset of the classification data should be stored in classification database 307 of front-end Ethernet switch 304 to maximize the number of packets that can be fully classified by front-end Ethernet switch 304. An exemplary application domain insight is that in a 3G/4G mobile backhaul system, much of the user plane traffic is between gateway or Radio Network Controller systems and little of the user plane traffic is likely to be for a base station that has only a handful of T1/E1 links.

Front-end Ethernet switch 304 tags processed packets with metadata indicating results of classification by switch 304, including an indication of whether classification database 307 had sufficient information to fully classify the packet. In some embodiments of system 300, the tagging is performed via packet metadata. In described embodiments, the packet tags might be implemented as metadata in virtual pipeline task parameters of network processor 100 (e.g., if network processor 100 is implemented on the same SoC as switch 304) or as a specialized header field of the packet (e.g., in a header identified by a special EtherType in an Ethernet packet) if the packet is sent over a communication link from switch 304 to network processor 100.

Thus, described embodiments implement a "fast path" for classifying at least a subset of packets received by system 300 by switch 304 without any classification processing by network processor 100 (and software running on network processor 100), thus reducing the amount of time needed to classify the packet. In described embodiments, the "fast path" processing might include Ethernet/MPLS switching, IP header classification and routing look-up, filtering and discarding of packets, and counting packets (e.g., for packets for which an ACL rule in switch 304 indicates the packet should be discarded). Typical packet classification operations includes, for example, look-ups of packet fields to digest summarized results, policing/metering results, and summarizing information about the packet format and location of key fields.

In system 300, the contents of the full classification database other than the MAC addresses are provided via ACL and policy-based routing information, or managed by control plane software (e.g., for IP routing) running on network processor 100. Both switch 304 and network processor 100 maintain counters tracking the number of times during a given time period each entry in the classification database (e.g., classification database 307 of switch 304, and the full classification database stored in memory 120 of network processor 100) is referenced. Network processor 100 monitors these counts and uses that information together with the application domain insights determines what subset of the entries in the full classification database should be kept in the partial database stored in classification database 307 of switch 304.

Switch 304 tags packets that matched one of the classification rules in the limited size classification database 307. The packets are then sent, along with the tag data, to network processor 100. Based on the tag data, network processor 100 determines if additional classification processing is required (e.g., by employing the full classification database stored in memory 120) before making a treatment decision for processing the packet. As described, network processor 100 tracks which rules in its database are used to perform classification processing. Based at least partly on which rules are used more frequently, network processor 100 might move entries into and out of classification database 307 to maximize the number of packets for which switch 304 can perform some or all classification processing.

One possible complication with moving entries into and out of classification database 307 is that when an entry is installed in classification database 307, switch 304 can now classify and perhaps fully process received packets that, previously, could not be classified or fully processed by switch 304. Such packets might now take a more optimized path through the rest of system 300 than the previously received packets that required at least some processing by network processor 100. Previously received packets might, thus, still be in-flight in system 300 at the time a subsequent packet can be processed by switch 304. Therefore, system 300 might employ external buffering via a looparound path to maintain packet ordering in system 300. Such external buffering might be implemented as described in related U.S. patent application Ser. No. 13/746,080, filed on common date, included by reference herein.

Figure 4:
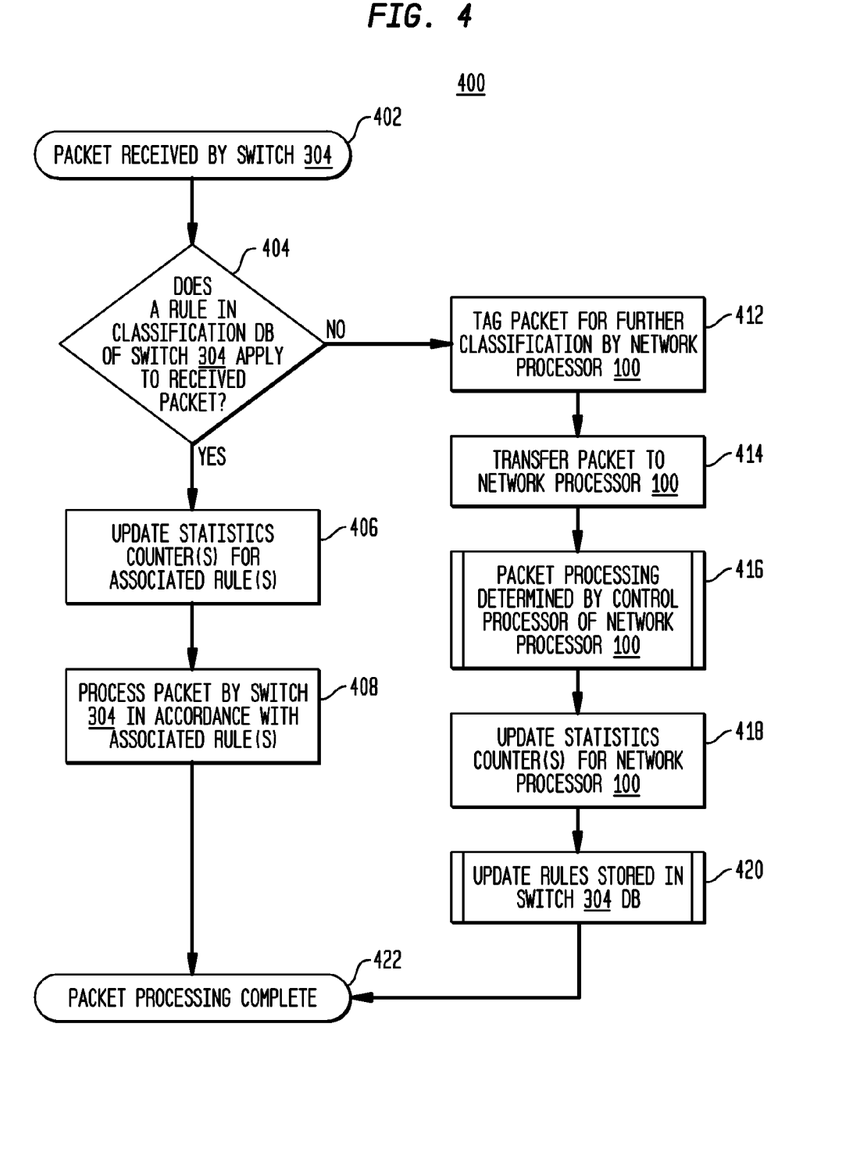
FIG. 4 shows a flow diagram of a packet processing algorithm of the system of FIG. 3 in accordance with exemplary embodiments.

FIG. 4 shows a flow diagram of packet classification and processing algorithm 400 of system 300. At step 402, a packet is received by switch 304. At step 404, switch 304 attempts to classify the received packet, for example, by determining whether one or more classification rules in database 307 apply to the received packet. If, at step 404, a classification rule in database 307 does apply to the received packet, then at step 406, switch 304 updates the counters for the applicable classification rules to indicate that the rules were used in a given time period to classify a packet. For example, the counters might be implemented on a control processor of network processor 100 (e.g., one of μP cores 106). The control processor might periodically clear or reset the counters, or monitor for when the counters have rolled over a threshold value. Further, the control processor might track a number of times the counters roll over and maintain histogram-like information for each counter every time period. The histogram information can be employed to determine if certain classification rules should be loaded into database 307 at certain times to further improve the offload of classification to switch 304 (e.g., to determine if certain rules are more valuable to have loaded in the switch at certain times of day, certain days of the week, etc.). At step 408, switch 304 classifies and processes the received packet in accordance with the rules in database 307, and the packet is sent to one or more corresponding destination addresses. At step 422, process 400 completes.

If, at step 404, no classification rules in database 307 apply to the received packet, then at step 412, switch 304 tags the received packet with metadata to indicate that further classification processing is required. The tagged metadata might also include a sequence number or a timestamp for tracking packet ordering (or any monotonically increasing counter to ensure that packets arriving at different times have different counter values assigned to them). At step 414, switch 304 transfers the packet to network processor 100. At step 416, a control processor of network processor 100 (e.g., one of μP cores 106) determines how to classify and process the packet based on the full classification database stored in memory 120 of network processor 100. At step 418, network processor 100 updates counters for the applicable classification rules to indicate that the rules were used in a given time period to classify a packet. For example, the counters might operate substantially as described above regarding switch 304. At step 420, network processor 100, based on the counter values of switch 304 and the counter values of network processor 100, might update the rules stored in classification database 307. Although shown in FIG. 4 as occurring every time a packet is classified by network processor 100, updating classification database 307 at step 420 might alternatively take place, for example, on a periodic basis (e.g., a predetermined number of times during the time durations of the counters), or after a given number of packets are processed by system 300. Step 420 is described in greater detail in regard to FIG. 5. At step 422, process 400 completes.

Figure 5:
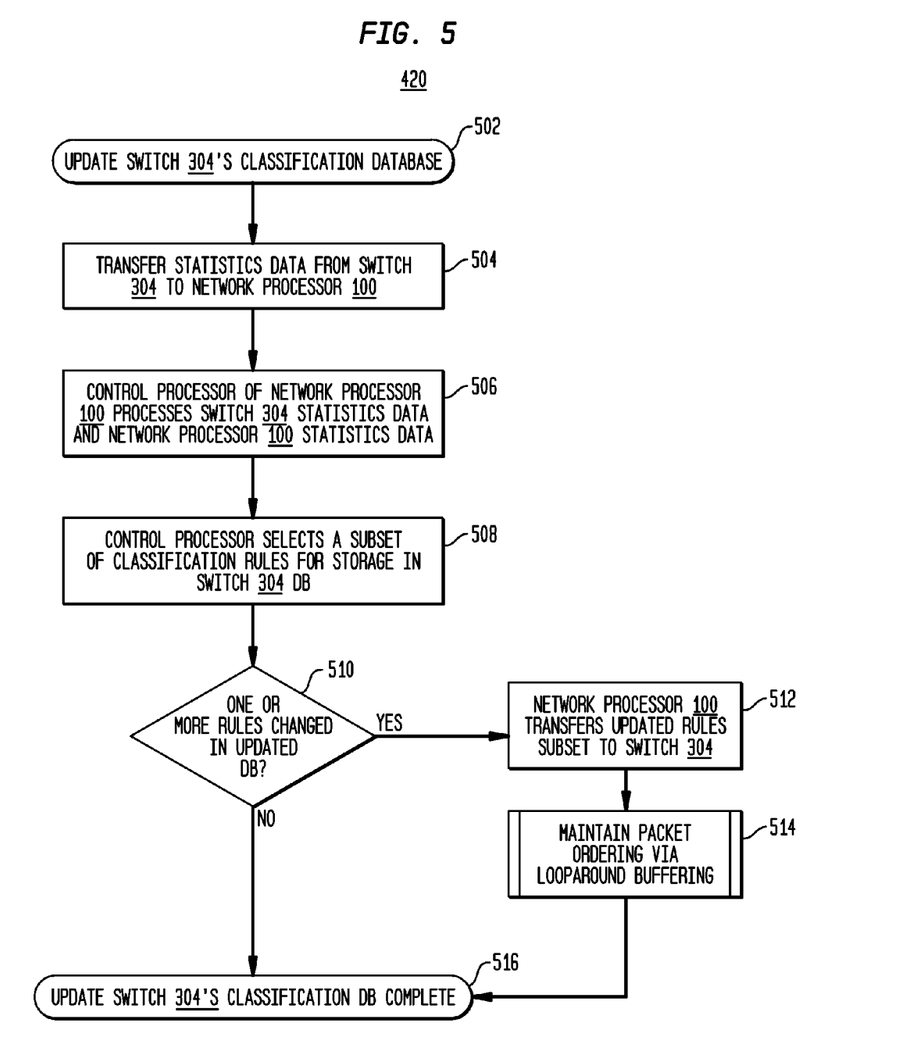
FIG. 5 shows a flow diagram of a process to update a classification database of the switch of FIG. 3 in accordance with exemplary embodiments.

FIG. 5 shows a flow diagram of classification database update process 420. At step 502, process 420 begins. At step 504, switch 304 transfers its counter values for classification database 307 and/or other statistics data to network processor 100. At step 506, a control processor of network processor 100 (e.g., one of μP cores 106) processes the counter and statistics data from switch 304 and also the counter and statistics data of network processor 100, and determines, based on the processed counter and statistics data, whether the subset of classification rules stored in database 307 of switch 304 should be updated to more efficiently classify and process packet traffic of switch 304. At step 510, if network processor 100 has determined that one or more rules in database 307 should be changed, then at step 512, network processor 100 generates an updated database and transfers the updated database to switch 304 for storage in database 307. At step 514, packet ordering is maintained between switch 304 and network processor 100 based on the tag data. Step 514 is described in greater detail in regard to FIG. 6. At step 516, classification database update process 420 completes. At step 510, if network processor 100 has determined that rules in database 307 do not need to be changed, then at step 516, classification database update process 420 completes.

Figure 6:
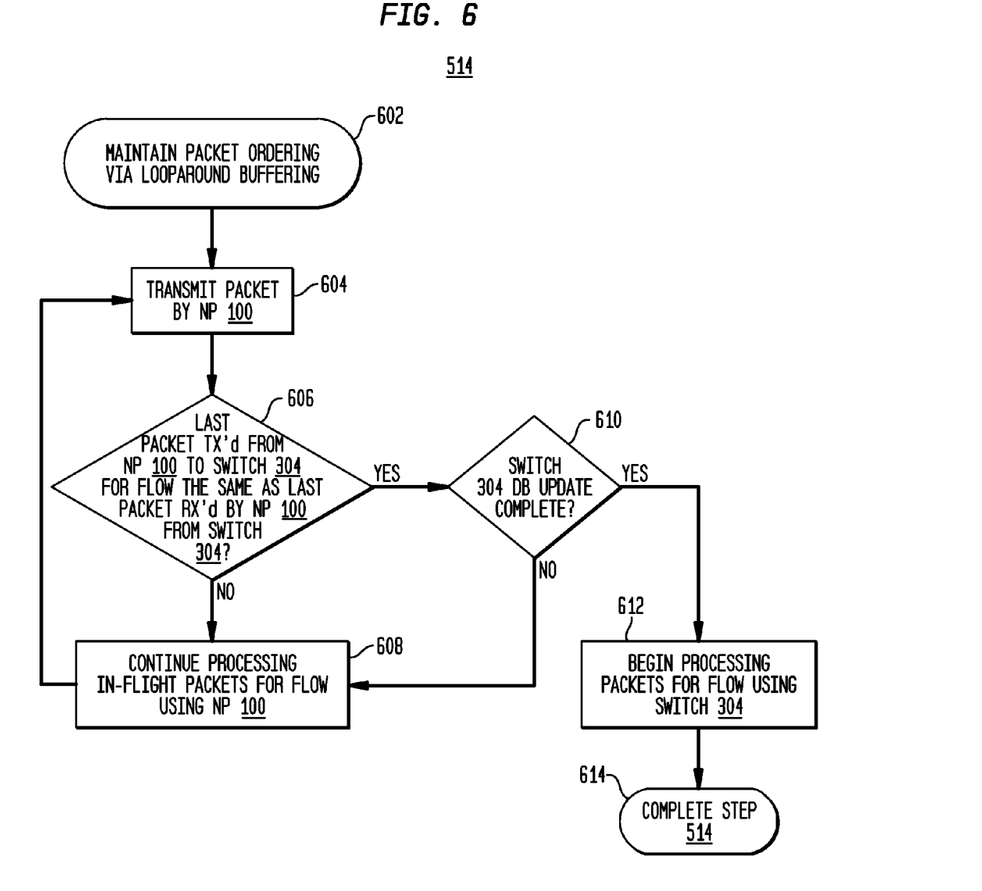
FIG. 6 shows a flow diagram of a packet ordering sub-process of the classification database update process of FIG. 5.

FIG. 6 shows a flow diagram of packet ordering process 514 of FIG. 5. At step 602, packet ordering process 514 starts. At step 604, packet data and tag data is transmitted by network processor 100 to one or more corresponding destinations within system 300 (e.g., via switch 304). At step 606, network processor 100 determines if the last data packet transmitted for a given flow is the same as the last packet received from switch 304 for the flow. For example, this determination might be made based on whether the tag data (e.g., the timestamp and/or sequence number) of the most recently transmitted packet from network processor 100 for a given flow matches the tag data (e.g., the timestamp and/or sequence number) of the last packet forwarded to network processor 100 for the given flow. If, at step 606, the tag data for the most recently transmitted packet for a flow matches the tag data of the last packet received for the flow, then there are no packets for the flow in-flight between switch 304 and network processor 100. At step 610, network processor 100 determines whether the update operation to classification database 307 of switch 304 is complete. If, at step 610, the update is complete, then, at step 612, subsequently received packets for the flow can be classified and processed by switch 304 without a risk of packets getting out of order. If, at step 610, the update of classification database 307 is complete, then, at step 608, subsequently received packets for the flow are classified and processed by network processor 100 until at steps 604 and 606, the tag data for the most recently transmitted packet for a flow matches the tag data of the last packet received for the flow and at step 610 classification database 307 has been updated completely, such that subsequently received packets can be classified and processed by switch 304. At step 614, packet ordering process 514 completes for the flow.

If, at step 606, the tag data for the most recently transmitted packet for a flow does not match the tag data of the last packet received for the flow, then, at step 608, switch 304 determines that there could be packets for the flow in-flight between switch 304 and network processor 100, such that packets could be misordered. At step 608, subsequently received packets for the flow are classified and processed by network processor 100 until at steps 604 and 606, the tag data for the most recently transmitted packet for a flow matches the tag data of the last packet received for the flow, such that subsequently received packets can be classified and processed by switch 304.

Thus, as described herein, described embodiments process data packets received by a switch coupled to a network processor. The switch determines whether one or more rules for classifying and processing the received packet are stored in an internal classification database of the switch. If one or more rules are stored in the internal database, the switch updates statistics corresponding to each of the rules and classifies and processes the received packet in accordance with the rules. If no associated rules are stored in the internal database, the switch tags the received packet with metadata and forwards the packet to the network processor. The network processor determines one or more rules for classifying and processing the forwarded packet in a classification database of the network processor and updates statistics corresponding to each of the rules in the classification database of the network processor. The network processor classifies and processes the packet in accordance with the rules in the classification database of the network processor, and updates the internal database of the switch.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of the described embodiments might be made by those skilled in the art without departing from the scope expressed in the following claims.

I claim:

1. A method of processing data packets received by a network switch coupled to a network processor, the method comprising:
   determining, by the network switch, whether one or more associated rules for classifying and processing the received packet are stored in an internal classification database of the network switch;
   if one or more associated rules are stored in the internal classification database:
      updating statistics data of the network switch corresponding to each of the one or more associated rules; and
      classifying and processing, by the network switch, the received packet in accordance with the one or more associated rules;
   otherwise, if no associated rules are stored in the internal classification database:
      tagging, by the network switch, the received packet with metadata;
      forwarding, by the network switch, the packet to the network processor;
      determining, by the network processor, one or more associated rules for classifying and processing the forwarded packet in a classification database of the network processor;
      updating statistics data of the network processor corresponding to each of the one or more associated rules in the classification database of the network processor;
      classifying and processing, by the network processor, the forwarded packet in accordance with the one or more associated rules in the classification database of the network processor; and
      updating, by the network processor, the internal classification database of the network switch.

2. The method of claim 1, wherein the step of updating, by the network processor, the internal classification database of the network switch comprises:
   providing the statistics data of the network switch to the network processor;
   determining, by a control processor of the network processor, based on the statistics data of the network switch and the statistics data of the network processor, whether the internal classification database of the network switch should be updated and, if so:
    generating, by the network processor, an updated database for the network switch;
    transferring, by the network processor to the network switch, the updated database;
    storing, by the network switch, the updated database in the internal classification database; and
    maintaining, by the network processor, packet ordering based on the corresponding tagged metadata.

3. The method of claim 2, wherein the metadata comprises at least one of a timestamp and a packet sequence number corresponding to a flow of the packet.

4. The method of claim 2, wherein the step of maintaining, by the network switch, packet ordering based on the corresponding tagged metadata comprises:
    determining, by the network processor, whether the tagged metadata of a packet most recently processed by the network processor matches metadata of a last packet of the corresponding flow forwarded by the network switch to the network processor and, if so:
        determining whether the step of storing the updated database in the internal classification database is complete and, if so:
            processing packets for the flow by the network switch;
        otherwise, if the step of storing the updated database in the internal classification database is incomplete:
            continuing to process packets for the flow by the network processor;
    if the tagged metadata of a packet most recently processed by the network processor does not match metadata of a last packet of the corresponding flow forwarded by the network switch to the network processor:
        continuing to process packets for the flow by the network processor.

5. The method of claim 2, wherein the statistics data of the network switch and the statistics data of the network processor each comprise a counter corresponding to each rule in the corresponding classification database, the method further comprising:
    incrementing each counter corresponding with a rule associated with the received packet.

6. The method of claim 2, further comprising:
    performing, periodically in time, the step of updating the internal classification database of the network switch; and
    resetting, periodically in time, the statistics data of the network switch and the statistics data of the network processor.

7. The method of claim 2 wherein the step of updating the internal classification database of the network switch is performed after a predetermined number of packets are classified and processed by at least one of the network switch and the network processor.

8. The method of claim 2 wherein the step of determining, by a control processor of the network processor, based on the statistics data of the network switch and the statistics data of the network processor, whether the internal classification database of the network switch should be updated further comprises:
    determining, based on the statistics data, whether one or more classification rules should be updated at certain times of operation of the network switch.

9. The method of claim 8, wherein the certain times of operation of the network switch comprise at least one of: time of day and day of week.

10. The method of claim 1, wherein:
    the network switch comprises an Ethernet switch; and
    the network processor comprises a plurality of processing modules and at least one shared memory, the processing modules configured to:
        generate one or more tasks corresponding to each packet received by the network processor;
        send the tasks between processing modules over one or more unidirectional ring buses, each ring bus coupled between two adjacent processing modules.

11. A non-transitory machine-readable medium, having encoded thereon program code, wherein, when the program code is executed by a machine, the machine implements a method of processing data packets received by a network switch coupled to a network processor, the method comprising:
    determining, by the network switch, whether one or more associated rules for classifying and processing the received packet are stored in an internal classification database of the network switch;
    if one or more associated rules are stored in the internal classification database:
        updating statistics data of the network switch corresponding to each of the one or more associated rules; and
        classifying and processing, by the network switch, the received packet in accordance with the one or more associated rules;
    otherwise, if no associated rules are stored in the internal classification database:
        tagging, by the network switch, the received packet with metadata;
        forwarding, by the network switch, the packet to the network processor;
        determining, by the network processor, one or more associated rules for classifying and processing the forwarded packet in a classification database of the network processor;
        updating statistics data of the network processor corresponding to each of the one or more associated rules in the classification database of the network processor;
        classifying and processing, by the network processor, the forwarded packet in accordance with the one or more associated rules in the classification database of the network processor; and
        updating, by the network processor, the internal classification database of the network switch.

12. The non-transitory machine-readable medium of claim 11, wherein the step of updating, by the network processor, the internal classification database of the network switch comprises:
    providing the statistics data of the network switch to the network processor;
    determining, by a control processor of the network processor, based on the statistics data of the network switch and the statistics data of the network processor, whether the internal classification database of the network switch should be updated and, if so:
        generating, by the network processor, an updated database for the network switch;
        transferring, by the network processor to the network switch, the updated database;
        storing, by the network switch, the updated database in the internal classification database; and
        maintaining, by the network processor, packet ordering based on the corresponding tagged metadata.

13. The non-transitory machine-readable medium of claim 12, wherein the step of maintaining, by the network switch, packet ordering based on the corresponding tagged metadata comprises:
  determining, by the network processor, whether the tagged metadata of a packet most recently processed by the network processor matches metadata of a last packet of the corresponding flow forwarded by the network switch to the network processor and, if so:
    determining whether the step of storing the updated database in the internal classification database is complete and, if so:
      processing packets for the flow by the network switch;
    otherwise, if the step of storing the updated database in the internal classification database is incomplete:
      continuing to process packets for the flow by the network processor;
  if the tagged metadata of a packet most recently processed by the network processor does not match metadata of a last packet of the corresponding flow forwarded by the network switch to the network processor:
    continuing to process packets for the flow by the network processor,
  wherein the metadata comprises at least one of a timestamp and a packet sequence number corresponding to a flow of the packet.

14. The non-transitory machine-readable medium of claim 12, wherein the statistics data of the network switch and the statistics data of the network processor each comprise a counter corresponding to each rule in the corresponding classification database, the method further comprising:
  incrementing each counter corresponding with a rule associated with the received packet.

15. The non-transitory machine-readable medium of claim 12, further comprising:
  performing, periodically in time, the step of updating the internal classification database of the network switch; and
  resetting, periodically in time, the statistics data of the network switch and the statistics data of the network processor.

16. The non-transitory machine-readable medium of claim 12 wherein the step of updating the internal classification database of the network switch is performed after a predetermined number of packets are classified and processed by at least one of the network switch and the network processor.

17. The non-transitory machine-readable medium of claim 12 wherein the step of determining, by a control processor of the network processor, based on the statistics data of the network switch and the statistics data of the network processor, whether the internal classification database of the network switch should be updated further comprises:
  determining, based on the statistics data, whether one or more classification rules should be updated at certain times of operation of the network switch, wherein the certain times of operation of the network switch comprise at least one of: time of day and day of week.

18. The non-transitory machine-readable medium of claim 11, wherein:
  the network switch comprises an Ethernet switch; and
  the network processor comprises a plurality of processing modules and at least one shared memory, the processing modules configured to:
    generate one or more tasks corresponding to each packet received by the network processor;
    send the tasks between processing modules over one or more unidirectional ring buses, each ring bus coupled between two adjacent processing modules.

19. A system comprising:
a network switch coupled to a network and a network processor;
the network switch configured to:
  receive a packet from the network;
  determine whether one or more associated rules for classifying and processing the received packet are stored in an internal classification database of the network switch;
  if one or more associated rules are stored in the internal classification database:
    update statistics data of the network switch corresponding to each of the one or more associated rules; and
    classify and process the received packet in accordance with the one or more associated rules;
  otherwise, if no associated rules are stored in the internal classification database:
    tag the received packet with metadata; and
    forward the packet to the network processor;
the network processor configured to:
  determine one or more associated rules for classifying and processing the forwarded packet in a classification database of the network processor;
  update statistics data of the network processor corresponding to each of the one or more associated rules in the classification database of the network processor;
  classify and process the forwarded packet in accordance with the one or more associated rules in the classification database of the network processor;
  wherein the network processor is configured to update the internal classification database of the network switch by:
    retrieving the statistics data of the network switch;
    determining, based on the statistics data of the network switch and the statistics data of the network processor, whether the internal classification database of the network switch should be updated and, if so:
      generating an updated database for the network switch;
      transferring the updated database to the network switch; and
      maintaining packet ordering based on the corresponding tagged metadata.

20. The system of claim 19, wherein:
the network processor is further configured to determine whether the tagged metadata of a packet most recently processed by the network processor matches metadata of a last packet of the corresponding flow forwarded by the network switch to the network processor and, if so:
  determine whether the updated database is stored in the internal classification database and, if so:
    the network switch is configured to process packets for the flow;
  otherwise, if the updated database is not stored in the internal classification database:
    the network processor continues processing packets for the flow;
if the tagged metadata of a packet most recently processed by the network processor does not match metadata of a last packet of the corresponding flow forwarded by the network switch to the network processor:
the network processor continues processing packets for the flow.

* * * * *